(12) United States Patent
Vandyke

(10) Patent No.: US 11,143,335 B2
(45) Date of Patent: Oct. 12, 2021

(54) FLEXIBLE HOSE WITH HELICAL STIFFENER

(71) Applicant: THE BOEING COMPANY, Chicago, IL (US)

(72) Inventor: Bryce A. Vandyke, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 145 days.

(21) Appl. No.: 16/458,768

(22) Filed: Jul. 1, 2019

(65) Prior Publication Data

US 2021/0003233 A1 Jan. 7, 2021

(51) Int. Cl.
*F16L 9/00* (2006.01)
*F16L 11/08* (2006.01)
*B32B 1/08* (2006.01)
*B29C 53/78* (2006.01)

(52) U.S. Cl.
CPC ........... *F16L 11/082* (2013.01); *B29C 53/785* (2013.01); *B32B 1/08* (2013.01)

(58) Field of Classification Search
CPC .......... F16L 11/00; F16L 11/11; F16L 11/112; F16L 11/115; F16L 11/08
USPC ................. 138/121, 122, 137, 125, 141, 173
See application file for complete search history.

(56) References Cited

U.S. PATENT DOCUMENTS

| | | | | |
|---|---|---|---|---|
| 6,024,131 A | * | 2/2000 | Lester | F16L 11/24 138/121 |
| 6,152,186 A | | 11/2000 | Arney et al. | |
| 6,827,109 B2 | * | 12/2004 | McCaughtry | F16L 11/112 138/122 |
| 7,946,311 B2 | * | 5/2011 | Koizumi | F16L 11/125 138/124 |
| 8,382,075 B2 | | 2/2013 | Duesel et al. | |
| 8,568,557 B2 | | 10/2013 | Duesel et al. | |
| 9,657,871 B2 | * | 5/2017 | Bang | F16L 11/127 |
| 9,909,699 B2 | * | 3/2018 | Bernhardt | F16L 11/088 |

OTHER PUBLICATIONS

U.S. Appl. No. 16/105,864, filed Aug. 20, 2018, entitled "Sound Absorbing Duct for Environmental Control System".

* cited by examiner

*Primary Examiner* — Patrick F Brinson
(74) *Attorney, Agent, or Firm* — Marshall, Gerstein & Borun LLP

(57) ABSTRACT

A flexible hose assembly includes a length of tubular hose formed from a spiral-wrapped layer of polymer material. A helical stiffener is disposed on an outer surface of the tubular hose. The helical stiffener comprises an elastomer material that is configured to bond or adhere to the polymer material of the tubular hose.

20 Claims, 7 Drawing Sheets

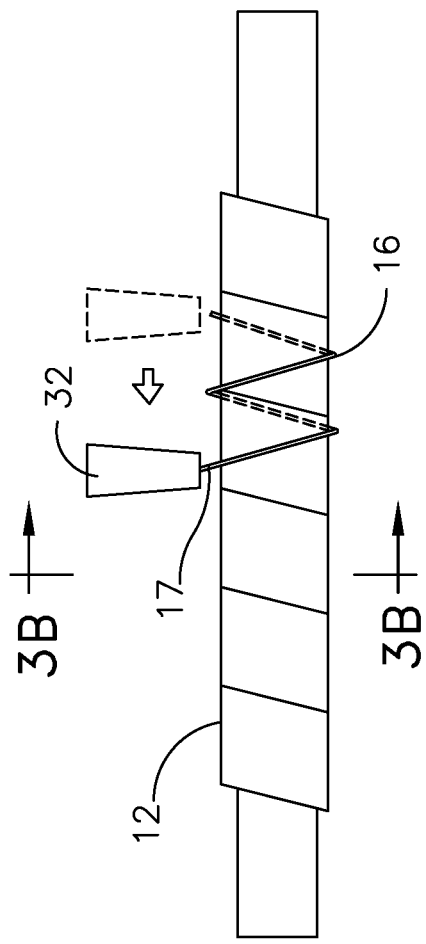
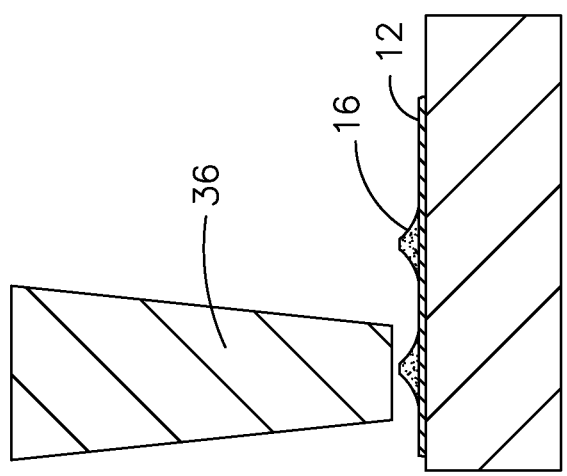
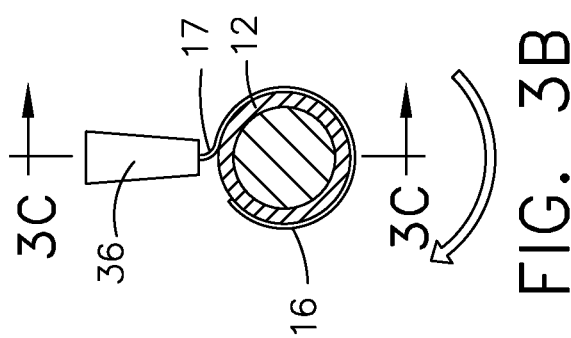
FIG. 3A
FIG. 3B
FIG. 3C

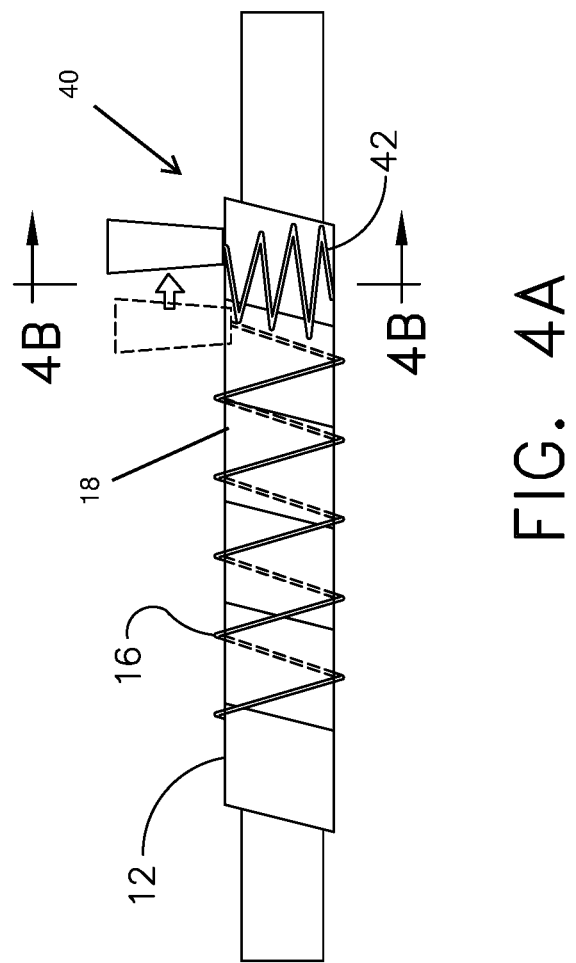
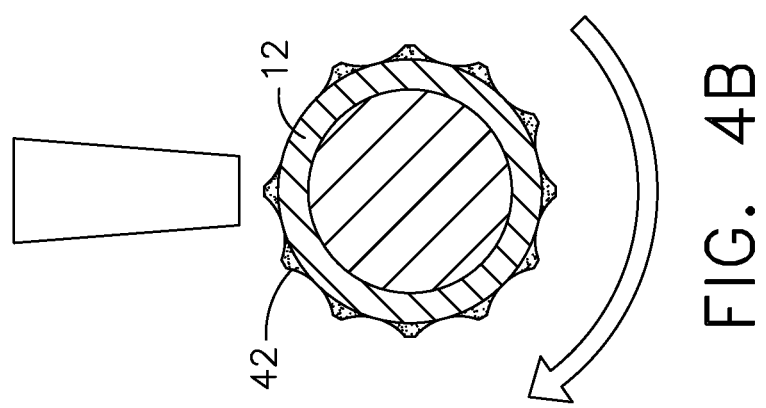

FLEXIBLE HOSE WITH HELICAL STIFFENER

FIELD

The disclosure general relates to flexible hoses and more specifically relates to flexible hoses having a helical stiffener.

BACKGROUND

Flexible hoses are needed to provide a passageway for directing fluids from one location to another location under pressure. These hoses confine the fluid during movement. Typically, the hose is connected at one end to a source of fluid, and is connected at an opposite end to a particular fluid destination. In some applications, such as in vehicle engines or vehicle air conditioning systems in the aircraft industry, the weight of all components, including any hoses, is important and should be minimized without sacrificing structural integrity.

Hoses for lightweight applications are typically made of silicone, urethane and/or polyether sulphone. Known hoses usually have more than one layer, or "ply," to increase the structural stability of the hose. However, known hoses typically require additional plies to be adhesively bonded to one another or need to be vulcanized to ensure that the plies of the hose are securely mounted together. The manufacturing process is labor intensive and costly. Also, multiple plies of the above materials tend to add significant weight to hoses which, in turn, add weight to the system in which the hoses are installed.

Known hoses are typically of a relatively short finite length, limited by manufacturing techniques. In addition, known hoses are relatively heavy and can require several plies of material and/or relatively thick plies of material to ensure their structural integrity.

While there are known hoses that incorporate helical stiffeners, such as the hose disclosed in U.S. Pat. No. 6,152,186, which is hereby incorporated by reference herein, these hoses or conduits use a helical stiffener made from a metallic or polymeric material, such as nylon or stainless steel, which is secured between two plies.

SUMMARY

One example of a flexible hose assembly includes a length of tubular hose formed from a spiral-wrapped layer of polymer material. A helical stiffener is disposed on an outer surface of the tubular hose. The helical stiffener comprises an elastomer material that is configured to bond or adhere to the polymer material of the tubular hose.

In another example, a method of manufacturing a flexible hose assembly includes arranging a mandrel, wrapping the mandrel with a polymer tape to form a spiral wrapped tubular hose, applying an elastomeric helical stiffener along an outer surface of a length of the spiral wrapped tubular hose, and bonding the helical stiffener to the spiral wrapped tubular hose.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 3A is a schematic side view of the flexible hose of FIG. 2A with an addition of a reinforcing circumferential ridge.

FIG. 3B is a lateral cross-sectional view of the flexible hose of FIG. 3A taken along line 3B-3B in FIG. 3A.

FIG. 3C is a close up cross-sectional view of the flexible hose of FIG. 3B taken along line 3C-3C in FIG. 3B.

FIG. 4A is a schematic side view of the flexible hose of FIG. 3A with an addition of an end collar.

FIG. 4B is a lateral cross-sectional view of the flexible hose of FIG. 4A taken along line 4B-4B in FIG. 4A.

DESCRIPTION

The hoses and methods of manufacturing hoses disclosed herein advantageously use additive manufacturing techniques that allow custom shapes and sizes to be quickly produced while forming strong reinforcing structures and overall lightweight hose assemblies.

As used herein, the term "bonding" or "bonded" means that the materials of two components are cross-linked with one another chemically. For example, when a silicone liquid is deposited onto a solid silicone surface, the silicone liquid cross-links with the solid silicone surface, thereby sharing chemical bonds between the two structures.

Figure 1:
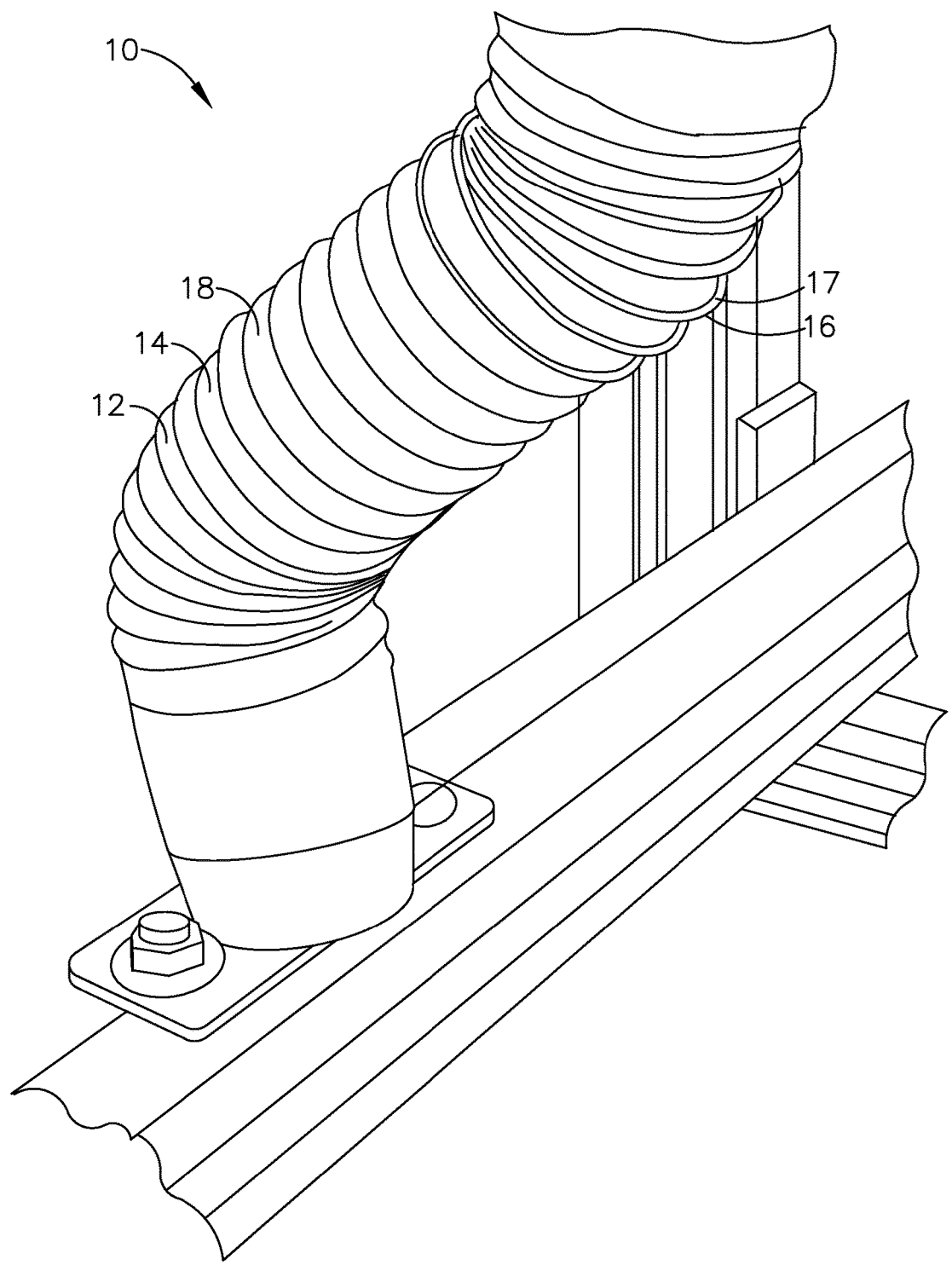
FIG. 1 is a perspective view of a flexible hose constructed in accordance with the teachings of the disclosure.

Turning now to FIG. 1, a flexible hose assembly 10 is illustrated that is constructed in accordance with the teachings of the disclosure. The flexible hose assembly 10 comprises a length of tubular hose 12 formed from a spiral-wrapped layer of polymer material 14. A helical stiffener 16 is disposed on an outer surface 18 of the tubular hose 12. The helical stiffener 16 comprises an elastomer material 17 that is configured to bond or adhere to the polymer material 14 of the tubular hose 12. The elastomer material 17, when adhered or deposited onto the polymer material 14 of the tubular hose 12, establishes a predetermined bond strength that inhibits disbonding of the helical stiffener 16 from the tubular hose 12.

In some embodiments, the elastomer material 17 comprises a room temperature vulcanized rubber that, when bonded or adhered to the polymer material 14 of the spiral-wrapped layers of the tubular hose 12, establishes a bond sufficient to provide a peal strength in the range of 10 to 70 pounds per inch width (1.75 to 12.3 Newtons per millimeter width). Peal strength in these ranges provides a robust, light weight, reinforcing structure for the tubular hose 12. The tubular hose may be used in low pressure environments, such as environments where the pressure of the fluid carried in the hose is in the range of about 1 psi to about 10 psi.

In other embodiments, the tubular hose 12 comprises a silicone coated cloth, and the helical stiffener 16 comprises a room temperature vulcanized rubber.

In yet other embodiments, the helical stiffener 16 comprises a synthetic polymer that, when bonded or adhered to the polymer material 14 of the tubular hose 12, establishes a bond sufficient to provide a peal strength of between 2-10 pounds per inch width (0.35 to 1.75 Newtons per millimeter width). As in the combinations discussed above, peal strength in these ranges provides a robust, light weight, reinforcing structure for the tubular hose 12.

In yet other embodiments, the tubular hose 12 comprises a silicone coated fiberglass fabric, and the helical stiffener 16 comprises an ethylene propylene elastomer.

Figure 6A:
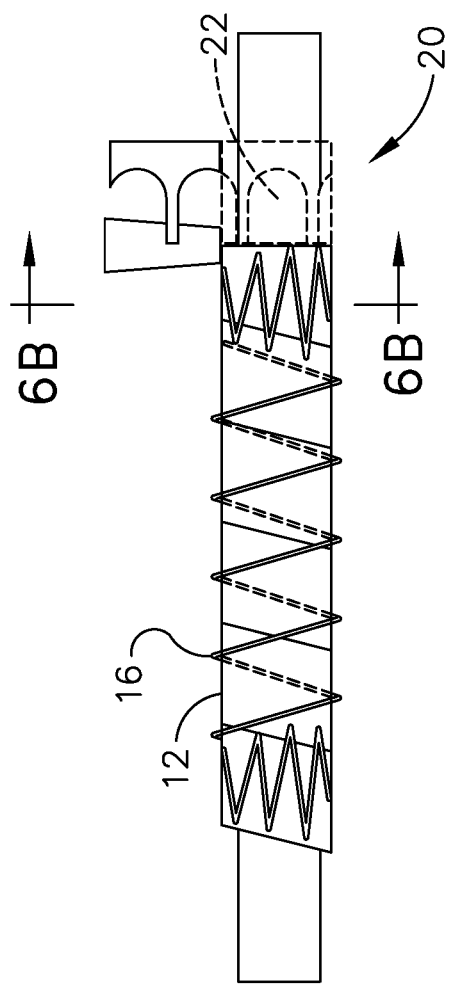
FIG. 6A is a schematic side view of the flexible hose of FIG. 5A with a removal of additional end material to form attachment tabs.
Figure 6C:
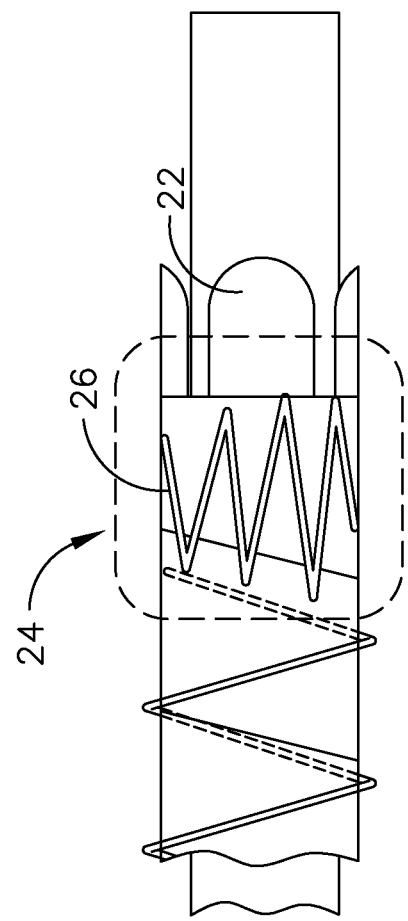
FIG. 6C is a close up end view of the flexible hose of FIG. 6A.
Figure 6B:
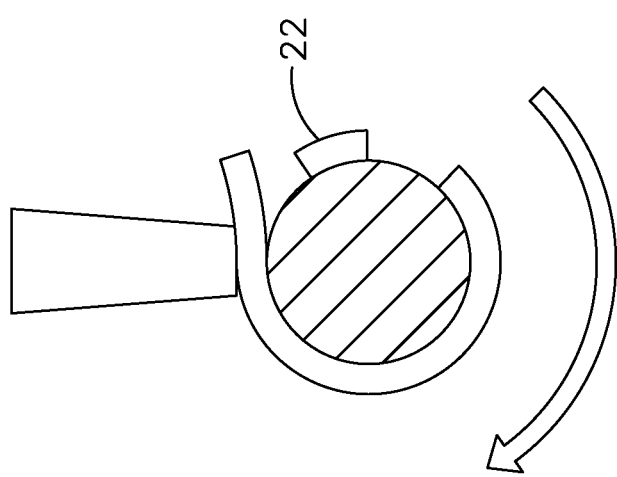
FIG. 6B is a lateral cross-sectional view of the flexible hose of FIG. 6A taken along line 6B-6B of FIG. 6A.

Turning now to FIGS. 6A-6C, an end 20 of the tubular hose 12 may include one or more pull tabs 22 that aid in installation of the tubular hose 12 onto an end of a duct or flange. The one or more pull tabs 22 may comprise a plurality of elongate tabs depending circumferentially about the end of the tubular hose 12, as illustrated in FIGS. 6A-6C. The pull tabs 22 provide a gripping surface that forms a gripping surface for a user to grasp, which aids in the ability of the user to apply a force to the tubular hose 12 to slide it over a flange or duct.

In some embodiments, an end portion of the helical stiffener 16 further includes a cylindrical coiled end 24 that is aligned with the 20 end of the tubular hose 12, thereby forming a cuffed end 26 of the flexible hose assembly 10, as illustrated in FIG. 6A and FIG. 6C.

Figure 2A:
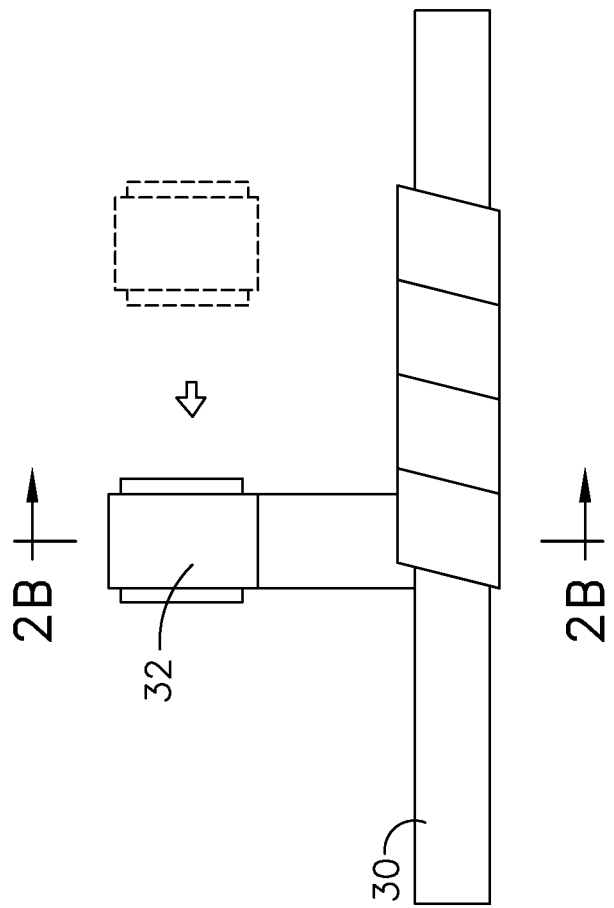
FIG. 2A. is a schematic side view of an initial construction of the flexible hose of FIG. 1.
Figure 2B:
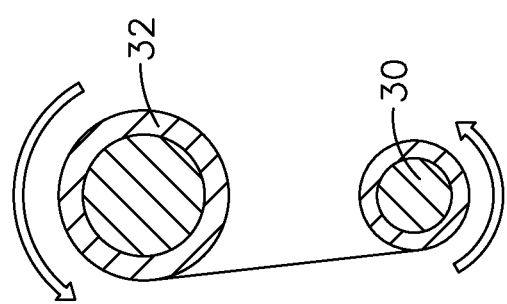
FIG. 2B is a lateral cross-sectional view of the flexible hose construction of FIG. 2A taken along line 2B-2B in FIG. 2A.

Returning now to FIGS. 2A and 2B, a method of manufacturing the flexible hose assembly 10 is described. Initially, a mandrel 30 is arranged to receive the polymer material 14 in the form of a tape 32 to form a spiral wrapped tubular hose 12. The tape 32 may be moved along the mandrel 30 as the tape 32 is wrapped around the mandrel 30 to form the spiral wrapped tubular hose 12. In other embodiments, the tape 32 may remain stationary and the mandrel 30 may be moved longitudinally as the tape 32 is wrapped around the mandrel 30.

The elastomeric material 17 is applied along the outer surface 18 of a length of the spiral wrapped tubular hose 12 to form the helical stiffener 16, as illustrated in FIGS. 3A-3C. The elastomeric material 17 may be deposited on the tubular hose 12 by a nozzle 36. The nozzle 36 lays down a layer of the elastomeric material 17 in the form of a triangle of pyramid, as illustrated in FIG. 3C. The triangle or pyramid shape provides a relatively large base that enhances bonding between the helical stiffener 16 and the spiral wrapped tubular hose 12.

Figure 7C:
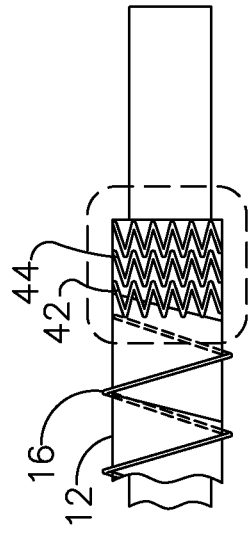
FIG. 7C is a close up end view of yet another alternate embodiment of an end cuff of the flexible hose of FIG. 4A.

FIGS. 4A and 4B illustrate forming an end cuff 40 at one end of the spiral wrapped tubular hose 12. The end cuff 40 is formed by depositing a first bead 42 of elastomeric material in a substantially longitudinal direction along the outer surface 18 of the spiral wrapped hose 12, the first bead 42 overlapping a portion of the elastomeric helical stiffener 16. In other embodiments, the end cuff 40 may be formed by depositing a second bead 44 of elastomeric material in a substantially longitudinal direction along the outer surface 18 of the spiral wrapped hose 12, the second bead 44 overlapping a portion of the elastomeric helical stiffener 16, as illustrated in FIG. 7C. In yet other embodiments, the end cuff may be formed by depositing a first bead 42 of elastomeric material in a circumferential direction around the outer surface 18 of the spiral wrapped hose 12, the first bead 42 overlapping a portion of the elastomeric helical stiffener 16 and a second bead 44 of elastomeric material in a circumferential direction around the outer surface 18 of the spiral wrapped hose 12, the second bead 44 overlapping a portion of the elastomeric helical stiffener 16, as illustrated in FIG. 7B.

Figure 7D:
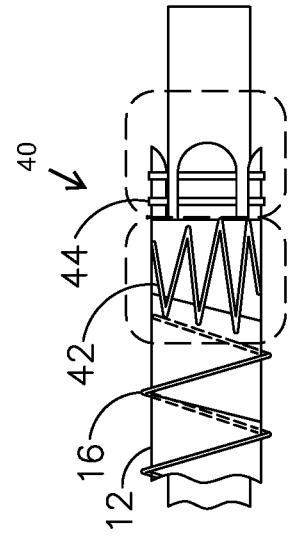
FIG. 7D is a close up end view of yet another alternate embodiment of an end cuff of the flexible hose of FIG. 4A.
Figure 7A:
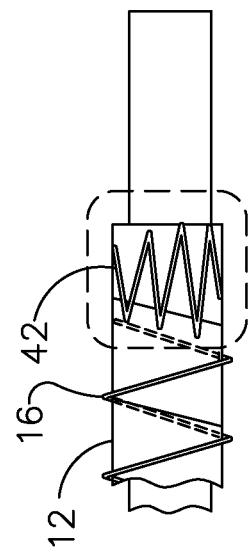
FIG. 7A is a close up end view of an alternate embodiment of an end cuff of the flexible hose of FIG. 4A.
Figure 7B:
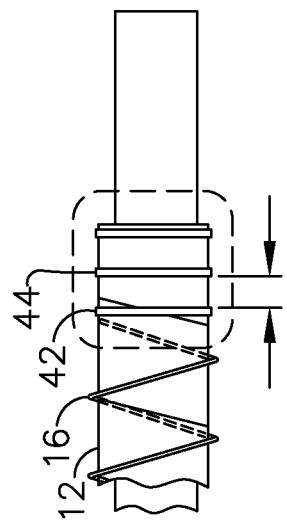
FIG. 7B is a close up end view of another alternate embodiment of an end cuff of the flexible hose of FIG. 4A.

In yet other embodiments, the end cuff 40 may be formed by depositing a first bead 42 of elastomeric material in a substantially longitudinal direction along the outer surface 18 of the spiral wrapped hose 12, the first bead 42 overlapping a portion of the elastomeric helical stiffener 16, and depositing a second bead 44 of elastomeric material in a circumferential direction around the outer surface 18 of the spiral wrapped hose 12, as illustrated in FIG. 7D. The second bead 44 may traverse across the plurality of tabs 22, which may be formed as described above with respect to FIGS. 6A-6C. More specifically, the second bead 44 may be deposited around the outer surface of the spiral wrapped hose 12, and then the end cuff 40 may be trimmed to form the tabs 22.

Figure 5A:
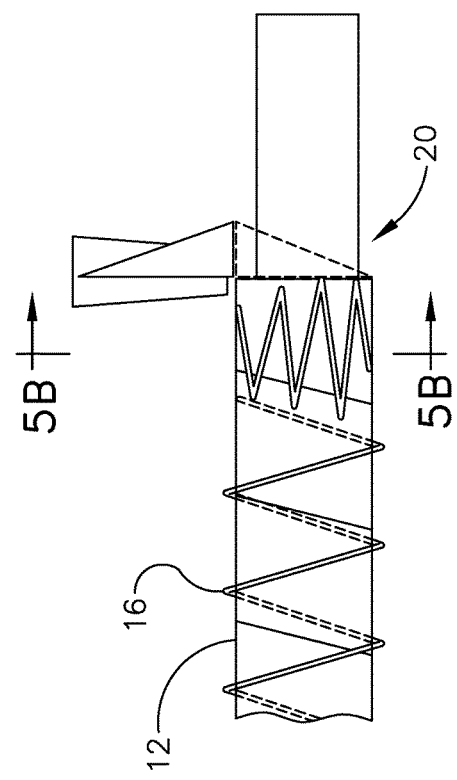
FIG. 5A is a schematic side view of the flexible hose of FIG. 4A with a removal of a portion of the end collar.
Figure 5B:
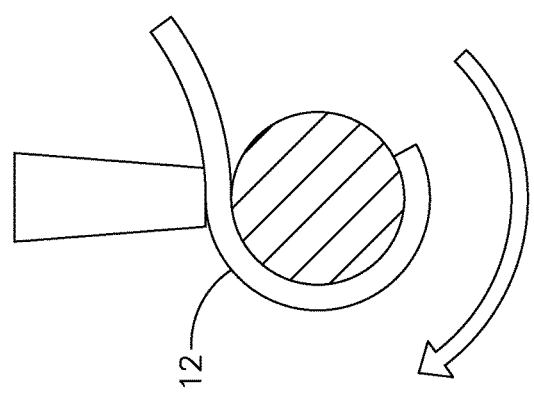
FIG. 5B is a lateral cross-sectional view of the flexible hose of FIG. 5A taken along FIG. 5B-5B in FIG. 5A.

Turning now to FIGS. 5A and 5B, the end 20 of the spiral wrapped tubular hose 12 may be trimmed to produce an end that is substantially perpendicular to a longitudinal axis of the spiral wrapped tubular hose 12. The trimming process may include producing the plurality of tabs 22 illustrated in FIGS. 6A-6C.

While various embodiments have been described above, this disclosure is not intended to be limited thereto. Variations can be made to the disclosed embodiments that are still within the scope of the appended claims.

What is claimed:

1. A flexible hose assembly, comprising:
a length of tubular hose formed from a spiral-wrapped layer of polymer material; and
a helical stiffener disposed on an outer surface of the tubular hose,
wherein the helical stiffener comprises an elastomer material that is configured to bond to the polymer material of the tubular hose, and
wherein an end of the tubular hose includes one or more pull tabs that aid in installation of the tubular hose onto an end of a duct or flange.

2. The flexible hose assembly of claim 1, wherein the helical stiffener comprises an elastomer material that, when adhered or deposited onto the polymer material of the tubular hose, establishes a predetermined bond strength that inhibits disbonding of the helical stiffener from the tubular hose.

3. The flexible hose assembly of claim 1, wherein the helical stiffener comprises a room temperature vulcanized rubber that, when bonded or adhered to the polymer material of the spiral-wrapped layers of the tubular hose, establishes a bond sufficient to provide a peal strength in the range of 10 to 70 pounds per inch width (1.75 to 12.3 Newtons per millimeter width).

4. The flexible hose assembly of claim 1, wherein the tubular hose comprises a silicone coated cloth, and the helical stiffener comprises a room temperature vulcanized rubber.

5. The flexible hose assembly of claim 1, wherein the helical stiffener comprises a synthetic polymer that, when bonded or adhered to the polymer material of the tubular hose, establishes a bond sufficient to provide a peal strength of between 2-10 pounds per inch width (0.35 to 1.75 Newtons per millimeter width).

6. The flexible hose assembly of claim 1, wherein the tubular hose comprises a silicone coated fiberglass fabric, and the helical stiffener comprises an ethylene propylene elastomer.

7. The flexible hose assembly of claim 1, wherein the one or more pull tabs comprise a plurality of elongate tabs depending circumferentially about the end of the tubular hose.

8. The flexible hose assembly of claim 1, wherein an end portion of the helical stiffener further includes a cylindrical coiled end that is aligned with the end of the tubular hose, thereby forming a cuffed end of the flexible hose assembly.

9. A method of manufacturing a flexible hose assembly, the method comprising:
   arranging a mandrel;
   wrapping the mandrel with a polymer tape to form a spiral wrapped tubular hose;
   applying an elastomeric helical stiffener along an outer surface of a length of the spiral wrapped tubular hose;
   bonding the helical stiffener to the spiral wrapped tubular hose; and
   trimming an end of the spiral wrapped tubular hose, and forming a plurality of tabs at the end of the spiral wrapped tubular hose.

10. The method of claim 9, further comprising:
    forming an end cuff at one end of the spiral wrapped tubular hose.

11. The method of claim 10, wherein the step of forming an end cuff includes depositing a first bead of elastomeric material in a substantially longitudinal direction along the outer surface of the spiral wrapped hose, the first bead overlapping a portion of the elastomeric helical stiffener.

12. The method of claim 11, wherein the step of forming an end cuff includes depositing a second bead of elastomeric material in a substantially longitudinal direction along the outer surface of the spiral wrapped hose, the second bead overlapping a portion of the elastomeric helical stiffener.

13. The method of claim 10, wherein the step of forming an end cuff includes depositing a first bead of elastomeric material in a circumferential direction around the outer surface of the spiral wrapped hose, the first bead overlapping a portion of the elastomeric helical stiffener.

14. The method of claim 13, wherein the step of forming an end cuff includes depositing a second bead of elastomeric material in a circumferential direction around the outer surface of the spiral wrapped hose, the second bead overlapping a portion of the elastomeric helical stiffener.

15. The method of claim 10, wherein the step of forming an end cuff includes depositing a first bead of elastomeric material in a substantially longitudinal direction along the outer surface of the spiral wrapped hose, the first bead overlapping a portion of the elastomeric helical stiffener, and depositing a second bead of elastomeric material in a circumferential direction around the outer surface of the spiral wrapped hose.

16. The method of claim 9, further comprising depositing a first bead of elastomeric material in a substantially longitudinal direction along the outer surface of the spiral wrapped hose proximate the plurality of tabs, the first bead overlapping a portion of the elastomeric helical stiffener, and depositing a second bead of elastomeric material in a circumferential direction around the outer surface of the spiral wrapped hose, the second bead traversing across the plurality of tabs.

17. A flexible hose assembly, comprising:
   a length of tubular hose formed from a spiral-wrapped layer of polymer material;
   a helical stiffener disposed on an outer surface of the tubular hose; and
   an end cuff at one end of the tubular hose, the end cuff including a first bead of elastomeric material oriented in a substantially longitudinal direction along the outer surface of the tubular hose, the first bead overlapping a portion of the elastomeric helical stiffener,
   wherein the helical stiffener comprises an elastomer material that is configured to bond or adhere to the polymer material of the tubular hose.

18. The flexible hose assembly of claim 17, wherein at the one end of the tubular hose, one or more pull tabs are located that aid in installation of the tubular hose onto an end of a duct or flange.

19. The flexible hose assembly of claim 18, wherein the one or more pull tabs comprise a plurality of elongate tabs depending circumferentially about the end of the tubular hose.

20. The flexible hose assembly of claim 17, wherein an end portion of the helical stiffener further includes a cylindrical coiled end that is aligned with the end of the tubular hose, thereby forming the end cuff of the flexible hose assembly.

* * * * *